Jan. 23, 1951     O. B. BOOSE     2,539,343
HOSE JUMPER
Filed May 13, 1949     2 Sheets-Sheet 1
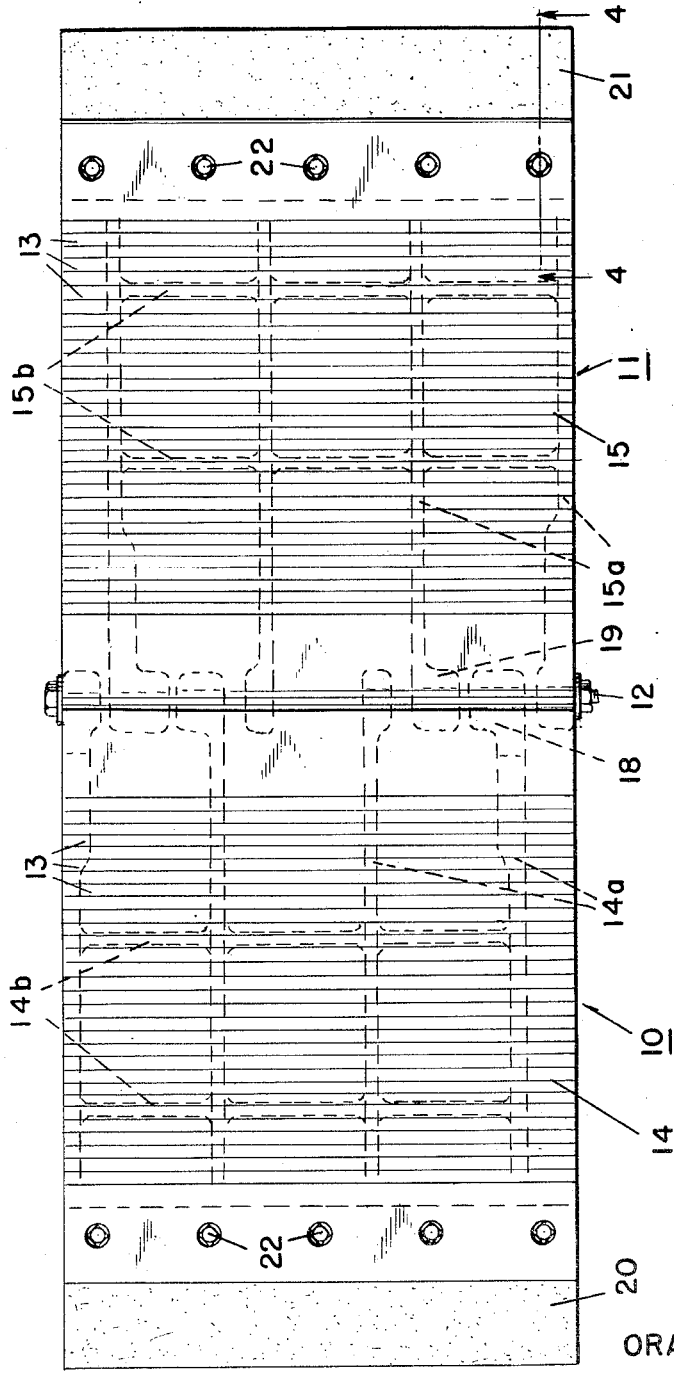
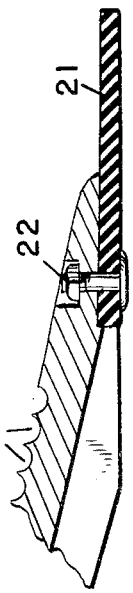
Inventor:
ORAN B. BOOSE
By *Harold Kiesewetter*
Attorney Jan. 23, 1951     O. B. BOOSE     2,539,343
HOSE JUMPER
Filed May 13, 1949     2 Sheets-Sheet 2
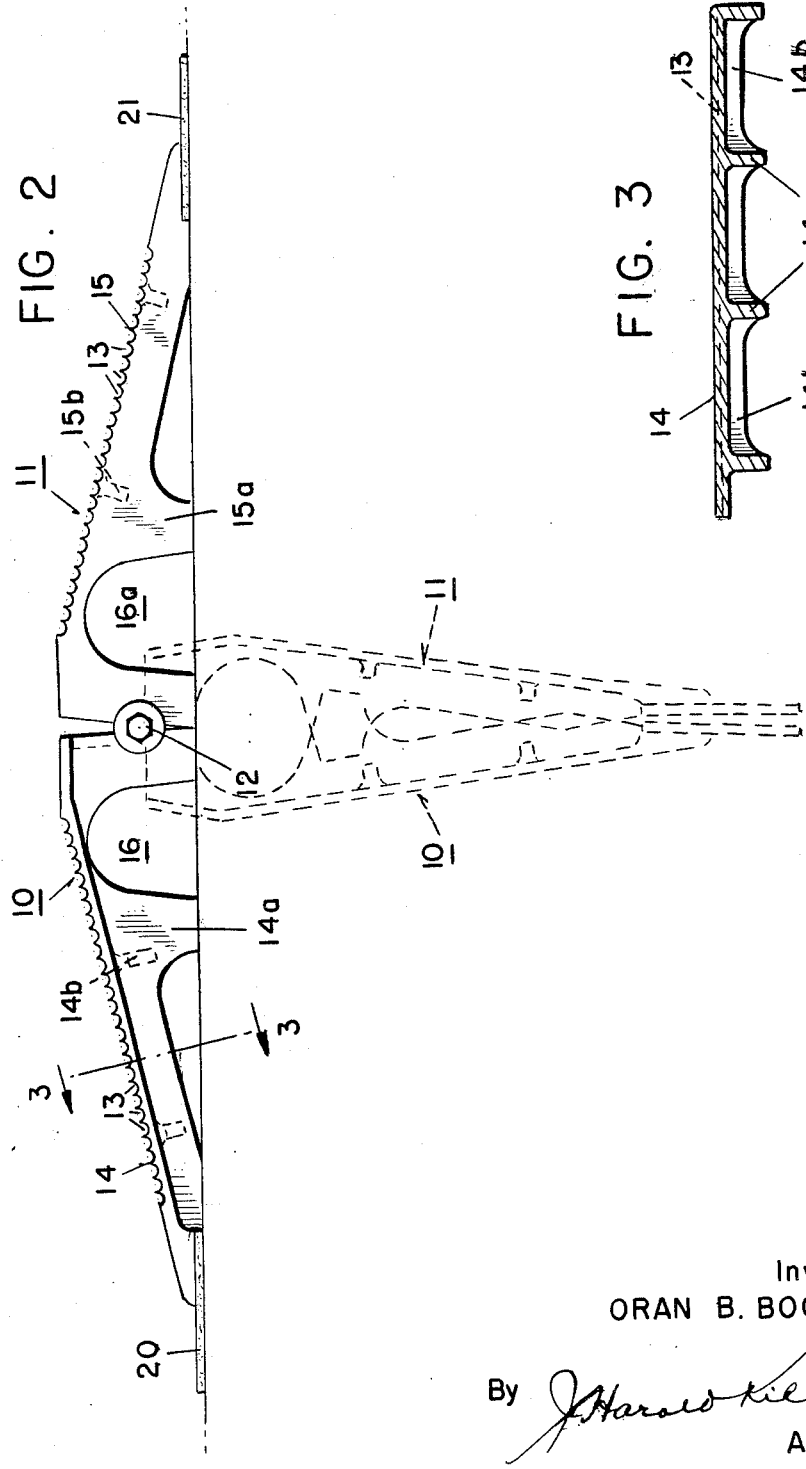
Inventor:
ORAN B. BOOSE
By *J. Harold Kilcoyne*
Attorney Patented Jan. 23, 1951

2,539,343

UNITED STATES PATENT OFFICE 2,539,343

HOSE JUMPER

Oran B. Boose, Reamstown, Pa.

Application May 13, 1949, Serial No. 93,095

5 Claims. (Cl. 104—275)

This invention relates to improvements in hose jumpers, as the term is used to designate bridging devices adapted to be placed over fire hose, surface pipes and conduits, tracks, and the like, to permit passage of vehicles without deformation or damage thereto.

Among the objects of this invention may be noted the provision of an inexpensive yet thoroughly effective and dependable hose jumper; the provision of a hose jumper of collapsible or fold-up construction permitting convenient handling, transport and storage and which, when folded and collapsed, occupies a minimum of space; the provision of a hose jumper characterized by hinged ramp sections of lightweight yet adequately reinforced construction capable of standing up under heavy weight and hard use; the provision of a hose jumper comprising hinged ramp sections employing under-face rib and web reinforcement, wherein the hinges connecting the sections and/or the reinforcing ribs and webs are constructed and arranged in such manner that the sections may fold into and nest with one another without interference and, when so folded, occupy a space not substantially exceeding the space occupied by one of the ramp sections; and the provision of a hose jumper incorporating means for preventing creeping or kick-back under lateral forces applied thereto by the wheels of a vehicle passing thereover.

Other objects and features of advantage of the improved hose bridge of this invention will be apparent from the following detailed description, taken with the accompanying drawings illustrating a preferred physical embodiment thereof, in which:

Fig. 1 is a plan view of the improved hose jumper in open or in-use position;

Fig. 2 is a side elevation of the hose jumper shown in Fig. 1, the view further illustrating in dotted lines the manner in which the ramp sections nest with one another when the jumper is closed;

Fig. 3 is a section taken on line 3—3 of Fig. 2; and

Fig. 4 is a section taken on line 4—4 of Fig. 1.

In the drawings, wherein like reference characters designate like parts throughout the several views, the improved hose bridge of the present invention is shown to comprise two oppositely inclined ramp sections 10, 11 pivotally connected in end-to-end relation by a hinge bolt 12. Each ramp section comprises a substantially rectangular tread plate which may be provided with traction-increasing corrugations 13 on its upper surface as shown, the tread plate 14 of the section 10 being provided on its under-face with a plurality of longitudinally extending reinforcing ribs 14a, and the tread plate 15 of the ramp section 11 being similarly provided with a plurality of longitudinally extending reinforcing ribs 15a. By reference to Fig. 2, it will be observed that the longitudinal reinforcing ribs 14a, 15a have increasing height as they extend towards the inner or hinged ends of the sections, which is such that the lower edges of the ribs are adapted to bear upon the ground or pavement. Thus, the reinforcing ribs in effect support the tread plates from the ground in inclined position throughout substantially the full length thereof and insure the necessary elevation of the inner or hinged ends of the sections as permits the desired bridging function of a hose jumper to be achieved.

To provide a passage for the hose, pipe or conduit, or track to be protected, the ribs of at least one ramp section are recessed adjacent the inner or raised end of the section to provide a downwardly opening cavity 16 in which the hose, conduit or track may be accommodated. In the illustrated embodiment, the longitudinal reinforcing ribs of both ramp sections are recessed, thus to provide a hose cavity 16 in one section and a similar hose cavity 16a in the other section.

By reference to Fig. 1, the inner ends of the longitudinal ribs of both sections may terminate in boss-like enlargements 18, 19 which are drilled so as to provide hinge eyes for the passage of the hinge bolt 12. Additional transverse reinforcement may also be provided by transverse webs 14b, 15b which, as seen in Fig. 1, extend between the longitudinal reinforcing ribs 14a, 15a. As is well understood, the reinforcing ribs and webs cooperate one with the other in strengthening the tread plates 14, 15 against buckling or cracking under the weight of vehicles passing thereover.

With the construction so far described, it will be understood that fire hose, surface pipes and conduits, tracks and the like may be protected from deformation and/or damage by the weight of vehicles passing thereover by placing two of the hose jumpers as described over the same. The jumpers thus act as bridges extending over the hose, conduit or track and, being supported from the ground or pavement, take the weight of the vehicle, so that it is not applied to the hose or track to be protected.

Due to the hinged connection between the ramp sections 10 and 11, a hose jumper as described is foldable to a closed position when not in use and during transport, storage, etc. Although foldable hose jumpers are known, the hose jumper of the present invention differs from the prior folding hose jumpers in being foldable more compactly and so as to occupy when folded the space usually taken up by one of the ramp sections. This desirable result is achieved in the present hose jumper by so disposing the hinge bolt 12 and the longitudinal reinforcing ribs 14a, 15a of the sections so that they may nest one within the other when folded.

Referring to Fig. 2, it will be seen that the hinge bolt 12, rather than being disposed on the bottom line of the sections, is raised substantially therefrom and extends along a line that is substantially midway of the vertical dimension of the inner or hinged ends of the ramp sections. Referring to Fig. 1, it is also seen that the longitudinal reinforcing ribs 14a and the hinge eyes 18 of the ramp section 10 are offset or displaced out of the line of the longitudinal reinforcing ribs 15a and the hinge eyes 19 of the ramp section 11. Accordingly, the ramp sections may fold on one another to the closed position indicated in Fig. 2, wherein it will be observed that the maximum dimension of the jumper when closed does not substantially exceed the height dimension of one of the ramp sections, and that the longitudinal reinforcing ribs of the section are disposed in side-by-side relationship, a feature which contributes to the compactness of the jumper when closed.

To prevent creeping and/or kick-back of the jumper due to lateral forces applied thereto when the wheels of a vehicle roll on to one ramp section and roll off on the other, the ramp sections are provided with ground-engaging flaps 20, 21 which extend beyond the outer or free ends of the sections. Referring to Fig. 4, each of the flaps may be fabricated from flexible material having good traction properties, such as rubber-impregnated canvas. The flaps may be connected to the ends of the tread plates 14, 15, which are beveled for this purpose, by carriage bolts 22, although other forms of flap securement may be employed. Through the provision of the flaps 20, 21 as aforesaid, creeping of the hose jumper is prevented when the wheels of the passing vehicle first engage the upwardly inclined tread plate, due to the fact that the major weight of the vehicle acts to press the flap against the ground and thereby secure the jumper in fixed position. Conversely, kick-back of the jumper is prevented as the vehicle rolls down the other ramp due to the fact that the weight of the vehicle is effective on the other flap, thereby to secure the jumper as a whole against movement relative to the ground.

Without further analysis, it will be seen that the described hose jumper achieves the objectives hereinbefore set forth. The hose jumper may be inexpensively manufactured, the ramp sections being formed as castings, for example. Due to the provision of reinforcing ribs and webs, as described, the tread plates are ground-supported throughout their entire length and are thereby enabled to withstand heavy loads without buckling or cracking. The unique positioning of the hinge bolt and the offsetting of the longitudinal reinforcing ribs provides the added advantage that the jumper may be folded to a closed position in which the ramp sections nest with one another and thereby occupy a minimum of space.

As many changes could be made in carrying out the above construction without departing from the scope of the invention, it is intended that all matter contained in the above description or shown in the accompanying drawings shall be interpreted as illustrative and not in a limiting sense.

I claim:

1. A hose jumper comprising oppositely inclined ramp sections, means for supporting the ramp sections in their oppositely inclined relation and hinge means operatively connecting said sections in end-to-end relation and permitting folding of said sections to closed position, said hinge means being disposed substantially midway vertically of the ends of said sections and including hinge eyes extending from the under face of the sections at their adjacent ends and a hinge pin extending through said eyes, the hinge eyes of one section being offset laterally from the hinge eyes of the other section whereby the sections may nest one with the other when in folded position.

2. A hose jumper comprising oppositely inclined ramp sections, and hinge means operatively connecting the sections in end-to-end relation, said ramp sections each comprising an inclined tread plate and longitudinal reinforcing ribs extending from the under face thereof, and serving to support the ramp sections in their oppositely inclined relation, the ribs of one section being offset longitudinally from the ribs of the other section and the ribs of each section being recessed adjacent their inner ends to provide a hose receiving cavity.

3. A hose jumper comprising oppositely inclined ramp sections, and hinge means operatively connecting said sections in end-to-end relation and permitting folding of the sections to closed position, said ramp sections each comprising a tread plate provided with longitudinal ribs extending from its under face and which have increasing height towards the hinged end of the section so that their bottom edges are adapted to bear on the ground or pavement, the hinge means being disposed above the bottom line of said sections, and the reinforcing ribs of one section being offset from the ribs of the other section, whereby the sections may nest with one another when folded to closed position, the ribs of at least one section being recessed adjacent their inner ends to provide a hose receiving cavity.

4. A hose jumper as set forth in claim 3, wherein the tread plates are further reinforced by reinforcing webs which extend laterally between the longitudinal reinforcing ribs.

5. A hose jumper comprising oppositely inclined ramp sections, hinge means operatively connecting said sections in end-to-end relation and permitting folding of said sections to closed position, said sections each comprising a tread plate provided with longitudinal reinforcing ribs and lateral reinforcing webs extending from its under face, the longtudinal ribs having increasing height towards the inner end of the section which is such that their bottom edges are adapted to bear on the ground or pavement, and the longitudinal ribs of at least one section being recessed adjacent their inner ends to provide a hose receiving cavity, flexible flaps connected to and extending beyond the free ends of said sections for preventing creeping and kick-back motion of the jumper under lateral forces applied thereto by a vehicle rolling on to and off the jumper, said hinge means being disposed above the bottom line of said sections and the longitudinal ribs of one section being offset from the longitudinal ribs of the other section, whereby the sections may nest one with another when folded to closed position.

ORAN B. BOOSE.

REFERENCES CITED

The following references are of record in the file of this patent:

UNITED STATES PATENTS

| Number | Name | Date |
|---|---|---|
| 87,399 | Dow | Mar. 2, 1869 |
| 88,364 | Burson | Mar. 30, 1869 |
| 126,635 | Hodges | May 14, 1872 |
| 2,166,031 | Wendell | July 11, 1939 |

FOREIGN PATENTS

| Number | Country | Date |
|---|---|---|
| 577,403 | Germany | May 11, 1933 |